United States Patent [19]
Houck

[11] 4,275,264
[45] Jun. 23, 1981

[54] PORTABLE HAND-HELD LENGTH PROBE WITH TRACING-UNIT-ACTUATED LENGTH SIGNAL OUTPUT CONTROL SWITCH

[75] Inventor: David J. Houck, Monkton Md. Md.

[73] Assignee: Electronic Modules Corporation, Timonium, Md.

[21] Appl. No.: 62,942

[22] Filed: Aug. 2, 1979

[51] Int. Cl.³ .................... G08C 21/00; G08B 5/22; G01B 3/12
[52] U.S. Cl. ........................... 178/18; 33/142; 346/143
[58] Field of Search ............... 33/125 M, 142, 141 R, 33/141 B, 141 E, 141.5; 178/18, 19; 340/146.3 SY; 346/143

[56] References Cited

U.S. PATENT DOCUMENTS

| 3,462,548 | 8/1969 | Rinder | 178/18 |
| 3,497,959 | 3/1970 | Engelsman | 33/142 |
| 3,886,311 | 5/1975 | Rodgers et al. | 178/18 |

*Primary Examiner*—Thomas A. Robinson
*Attorney, Agent, or Firm*—Reginald F. Pippin, Jr.

[57] ABSTRACT

A portable hand-held length probe with a length measuring wheel and a tracing unit which is mounted adjacent the wheel and is movable by pressing the tracing unit against a surface to be measured. A wheel movement indicative output signal is effected as function of wheel movement, and the probe carries a switch which is actuated as a function of depress-release movement of the tracing unit to enable or disable transmission of the wheel movement indicative output signal.

9 Claims, 5 Drawing Figures

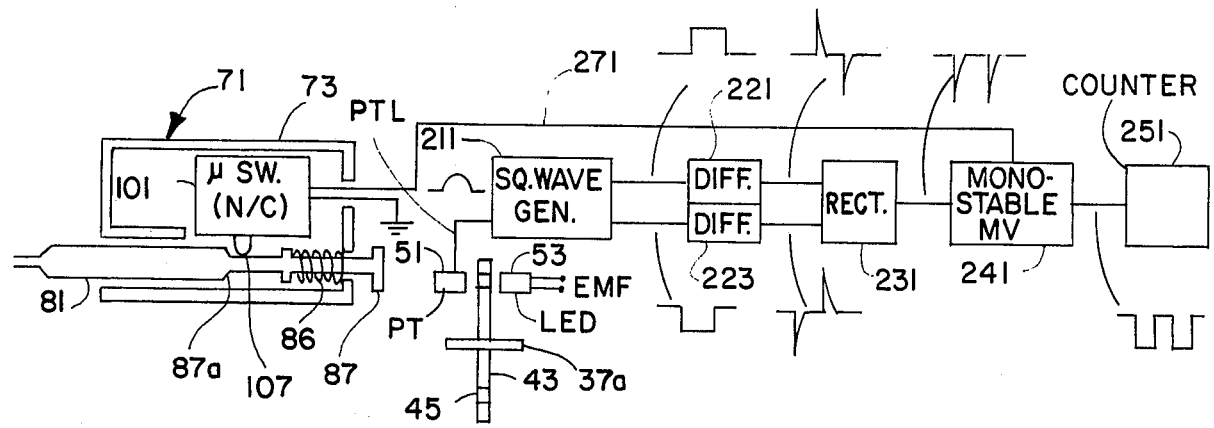
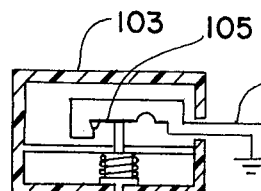
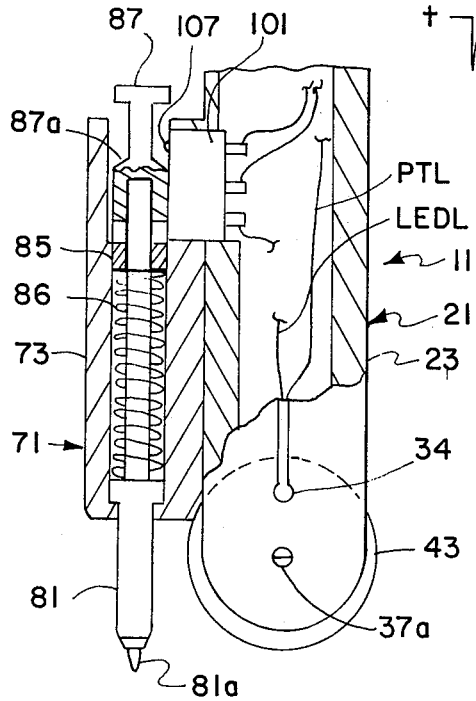
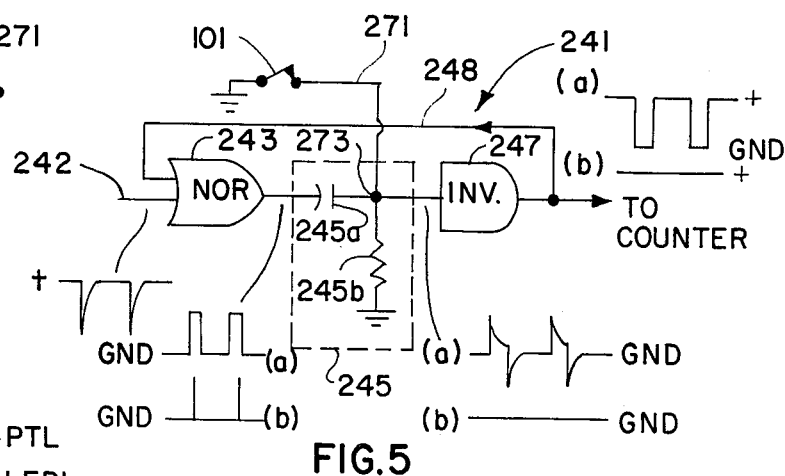
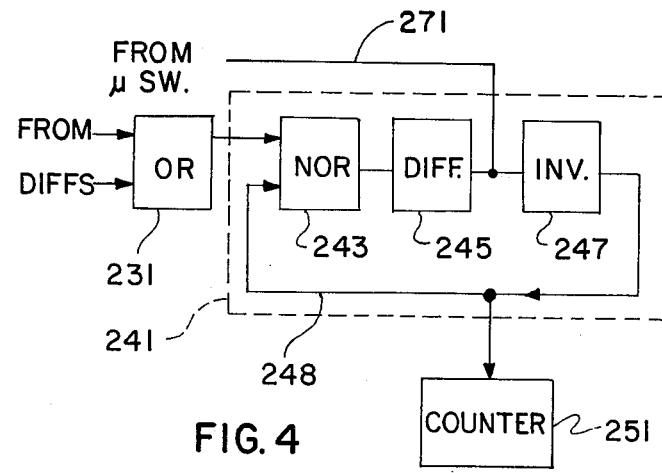

PORTABLE HAND-HELD LENGTH PROBE WITH TRACING-UNIT-ACTUATED LENGTH SIGNAL OUTPUT CONTROL SWITCH

This invention relates to apparatus for taking length measurements, and more particularly to a portable hand-held length probe with a tracing/marking-unit-actuated length-signal-output control switch which aids in reducing the likelihood of false length registry counts.

Various length measurement probes have been made, including wheel movement probes in which count pulses are initiated and registered as a function of wheel movement across a surface, and manual switches have been employed for turning off or disabling the wheel motion-responsive count pulse outputs. However, such manual switches are not satisfactory due to the possibilities of operator forgetfulness, the inadvertent movement of the wheel just before switching to disablement or just after switching on, etc.

It is accordingly a feature of this invention to provide an improved portable hand-held length probe arrangement that has a control switch carried thereon and which switch is responsive to depressed movement of a tracing or marking unit to enable the passage of a count output signal as a function of wheel movement on a surface to be measured, and which switch returns to a condition wherein the passage of such count output signal is prevented when the tracing or marking unit is released, thereby reducing the likelihood of registry of false length counts. For purposes of this application and description, the terms tracing and marking are used synonymously and interchangeably, as covering a desired movement along a surface, with physical marking being present or not as may be determined by the employment of a physical marking element or a simple tracing element such as a small rotatable or fixed ball-shaped contact element.

Still other features and attendant advantages will become apparent from a reading of the following detailed description of a physical embodiment constructed in accordance with the invention, taken in conjunction with the accompanying drawings, wherein:

FIG. 1 is a schematic illustration of a tracing or marker unit embodiment according to the invention, shown in combined schematic mechanical/electrical form.

FIG. 2 is a schematic illustration of a snap-action grounding switch of FIG. 1.

FIG. 3 is a fragmentary view in simple schematic mechanical form of a probe according to the present invention.

FIG. 4 is an electrical block diagram showing in more detail the portion of the circuitry of FIG. 1 which is hard grounded as a function of pressing the marker/tracing unit against a surface to be measured.

FIG. 5 is a further electrical block diagram showing in still more detail the portion of the circuitry of FIG. 1 which is hard grounded as a function of marker/tracing unit depression.

Referring now in detail to the Figures of the drawings, a length probe and marker or tracing unit and switch arrangement 11 is illustrated in FIG. 3. This probe/tracer/switch arrangement 11 includes a length probe 21, a marker or tracing unit assembly 71 and a normally closed miniature self-return snap-action switch 101, such as a microswitch, actuated as a function of sliding movement of the marker/tracing unit 81 which is longitudinally slidable in housing 73. In the course of operation of probe/marker/switch arrangement 11, the operator will place length wheel 43 of probe 21 in contact with a surface on which a length is to be measured. A lead or other marker or tracing element 81a of slidable marker/tracing unit 81 is also brought into contact with the same surface, usually at the beginning point of the line to be measured. The operation to this point is conventional. However, according to the present invention, the marker/tracing unit is associated with a switch 101 which controls the transmission of length signals from the wheel movement pickup to a counter 251 which indicates the length through registering pulses occurring as a function of wheel movement. The switch 101 is normally closed and in this condition such connects a hard ground to a normally soft grounded point in the signal transmission circuitry between a pick-up photo transistor 51 and the counter. Depression or rearward sliding movement of tracer unit 81 against the action of return compression spring 86 will effect opening of the normally self-closed contacts of switch 101 through contact and movement of actuator 107 by annular inclined cam surface 87a on the rear handle 87 of the marker/tracing unit 81, and corresponding opening movement of self-return snap-action contact arm 105 in switch 101.

This will enable and ready the circuit for transmission of signals from the photo transistor pickup 51 adjacent wheel 43 to the counter 251. The rotary movement of the wheel 43 along the surface on which the linear path is to be measured in following or leading relation to the marker or tracing unit 81 will produce electrical pulses, which are desirably suitably shaped and operated upon during transmission, to ultimately energize counter 251 for each pulse emanating from photo transistor 51 while the marker/tracing unit is thus depressed and switch 101 is open. Upon releasing the pressure on marker unit 81 the return spring 86 returns the marker unit 81 to its quiescent condition as shown in FIG. 3, at which position switch 101 is again self-closed through self-return of snap-action contact arm 105 to closed condition, and the transmission circuitry is effectively disabled.

In accomplishing the foregoing, wheel 43 is mounted on a bearing pin 37a in length probe housing 23, and has plural holes 45 at equal spaced intervals about and within its periphery, for successive registry with interfacing infrared light-emitting diode 53 and infrared-sensitive photodiode 51. An electrical pulse is produced with each such successive registry of the holes 45 with LED 53 and photo transistor 51, as generally indicated on the circuit diagram of FIG. 1. The particular details of the pick up arrangement do not themselves form a part of this invention and are accordingly not further shown or described. A preferred arrangement thereof is shown and described in my copending patent application Ser. No. 62,939, for Portable Length Probe With Improved Wheel Pickup Arrangement to which reference is made, and the specification and drawings of which are hereby incorporated herein by reference.

The particular details of the marker or tracing unit 81 and switch 101 do not themselves form a part of this invention, and accordingly are not shown or described in further detail herein. However, the overall combination wheel motion and pick up and switch 101 with the novel control thereof by marker or tracing unit 81, particularly in conjunction with the soft-mode-grounded multivibrator 241, subsequently described, form the fundamental features of the invention. For details of several suitable and preferred embodiments of a length probe 21, marker 81 and switch 101 construction, reference is made to my copending application Ser. No. 62,941, entitled Length Probe With Tracing Unit and Switch Arrangement, and the specification and drawings of which are hereby incorporated by reference, as well as to the aforementioned copending application Ser. No. 62,939, both of which are filed on the same date herewith.

The pulses from photo transistor 51 are fed into a square wave generator 211, such as a Schmitt trigger circuit, which generates mirror image square waves which in turn feed into respective differentiators 221, 223, the opposite going mirror outputs of which are fed into a full wave rectifier 231 which may take the form of a digital OR circuit and whose output is a spiked output which presents two spikes for each passing of the holes 45 past photo-transistor 51, which correspond to the leading and trailing edges of the square waves formed by square wave generator 211. This dual spike signal substantially doubles the accuracy permitted by the movement of wheel 43 for a given number of holes in the wheel, and as the quantity of holes for a given wheel size is practically limited the accuracy afforded thereby is of some substantial importance.

From rectifier 231 the spiked signal passes to a monostable multivibrator 241 which has a self-soft-grounded node point 273, which, if not hard grounded, enables passage of signals therepast. The contact arm 105 is connected to this node point 273 and thereby normally connects the node point 273 to ground except when switch contact 105 is open as previously described.

Referring to FIGS. 4 and 5, monostable multivibrator 241 is illustrated in digital unit form, including a NOR unit 243 feeding an RC differentiator 245, the output from which self soft grounded node point 273 thereof feeds into inverter 247, the output from which in turn is carried through a feedback loop to an input to NOR unit 243, and also feeds counter 251. The differentiator 245 includes a capacitor 245a soft connected to ground through node point 273 and a high value resistor 245b, having a value such as 240K ohms. The wave forms in operation of multivibrator 241 are illustrated in both the soft grounded condition of node point 273, with switch 101 open, and in the hard grounded condition of node point 73, with switch 101 normally closed. The operation is schematically illustrated by the generalized signal wave forms into and from each fundamental unit of multivibrator 241, the wave forms associated with soft grounding of the node point 273 being represented at (a) in each instance and the hard grounded condition wave forms being represented at (b).

In the soft grounded condition, NOR unit 243 has a square wave pulse output, as does inverter 247 with its inverted output, which enables NOR unit 243 to form its square wave output as a function initially of both each pulse from OR rectifier unit 231, and subsequently during the timed out duration of the feed back pulse from digital inverter 247. Thus, the counter 251 will be actuated by each pulse into the monostable multivibrator 241 in this soft grounded condition. However, when the node point 273 is hard grounded by closure of switch 101, the input to digital inverter 247 will remain at ground, and the output from inverter 247 will remain constant, even in the presence of pulse signals at the input to NOR gate unit 243, as shown by the wave forms indicated at (b) on FIG. 5. Thus, no motion of the wheel 43 will effect a count at counter 251 in the hard grounded condition effected by the normal self-return closure of switch 101 upon releasing pressure on the marker or tracing unit. It will be appreciated that this feature will aid in reduction of likelihood of registry of false length counts, which correspond to a false length indication.

While the invention has been illustrated and described with reference to a single embodiment, it will be appreciated that various modifications and improvements may be made without departing from the scope or spirit of the invention. Accordingly, the invention is not to be limited by the particular illustrative example, but only by the appended claims.

I claim:

1. A portable hand-held length probe, comprising
   a portable hand-held body with a nose wheel rotatably mounted thereon for length measuring movement over a surface,
   a movable tracing unit mounted in movable relationship on said body adjacent said nose wheel for movement relative to said body,
   spring means resiliently biasing said tracing unit to a first normal quiescent position, and said tracing unit being movable to a second position as a function of pressing said unit against a surface during tracing action therewith on a surface and in conjunction with rotational measuring movement of said wheel,
   signal means for effecting a length measurement indicative signal as a function of rotational movement of said wheel,
   and switch means carried by said body and responsive to movement of said tracing unit to said second position to enable passage of a said signal from said signal means, and said switch means being responsive to movement of said tracing unit to said first normal position to effect disablement of effective passage of said signal means signal.

2. A portable hand-held length probe, according to claim 1,
   said tracing unit comprising a marker carried by and longitudinally slidable relative to said body,
   said switch means being mounted on said body and actuated as a function of sliding movement of said tracing unit.

3. A portable hand-held length probe, according to claim 2,
   said switch comprising a self-return snap-action switch having exposed actuator means disposed adjacent to the path of movement of said tracing unit for actuation as a function of such movement.

4. A portable hand-held length probe, according to claim 3,
   said tracing unit having actuating means thereon actuating said actuator means as a function of said movement of said tracing unit.

5. A portable hand-held length probe, according to claim 4,
   said actuating means comprising a cam surface engagable with said actuator means.

6. A portable hand-held length probe, according to claim 1,
   said switch means being normally closed and spring biased by said spring means to said first position,
   said signal means comprising signal forming means and signal transmission means, said signal transmission means having a point therealong which is soft-grounded through a resistance element and which soft grounded point enables passage of a selected signal therethrough in the soft-grounded condition, but which will block said selected signal when said point is hard grounded, and means connecting said point to ground through said switch, whereby a said selected signal may pass said point when said switch is open and is prevented from passage past said point when said switch is closed.

7. A portable hand-held length probe, according to claim 6, said signal transmission means comprising a monostable multivibrator having a differentiator with a node soft-grounded through a high resistance element, said switch being connected in selectively hard-grounding or open relation to said node.

8. A portable hand-held length probe, according to claim 7, said monostable multivibrator further comprising a digital NOR unit connected in feeding relation to said differentiator, and an inverter the input of which is connected to the output from said node of said differentiator, and a feedback loop between the output of said inverter and the input to said NOR unit.

9. A portable hand-held length probe, according to claim 8, and counter means having its input connected to the output from said inverter.

* * * * *